(12) United States Patent
Sjödin

(10) Patent No.: US 8,287,805 B2
(45) Date of Patent: *Oct. 16, 2012

(54) BRAZING MATERIAL

(75) Inventor: Per Sjödin, Lund (SE)

(73) Assignee: Alfa Laval Corporate AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/515,046

(22) PCT Filed: Nov. 14, 2007

(86) PCT No.: PCT/SE2007/001010
§ 371 (c)(1),
(2), (4) Date: Jun. 11, 2009

(87) PCT Pub. No.: WO2008/060225
PCT Pub. Date: May 22, 2008

(65) Prior Publication Data
US 2009/0305078 A1   Dec. 10, 2009

(30) Foreign Application Priority Data
Nov. 17, 2006  (SE) ...................................... 0602466

(51) Int. Cl.
*C22C 38/34* (2006.01)
*C22C 38/54* (2006.01)
*C22C 38/44* (2006.01)

(52) U.S. Cl. ................ 420/50; 420/42; 420/46; 420/47; 420/51; 420/586.1; 420/582; 219/146.23; 219/146.41; 75/246

(58) Field of Classification Search .................... 420/42, 420/45–49, 50, 51, 586.2, 582, 586.1; 148/327; 219/146.23, 146.41; 428/682–685; 228/262.42; 75/246, 255

See application file for complete search history.

(56) References Cited

U.S. PATENT DOCUMENTS

| | | | | |
|---|---|---|---|---|
| 3,900,316 A | * | 8/1975 | Forbes Jones | ................... 420/42 |
| 4,410,604 A | | 10/1983 | Pohlman et al. | |
| 4,516,716 A | | 5/1985 | Coad | |
| 7,455,811 B2 | * | 11/2008 | Sjodin | ............................ 420/42 |

FOREIGN PATENT DOCUMENTS

| | | |
|---|---|---|
| WO | 0238327 A1 | 5/2002 |
| WO | 02098600 A1 | 12/2002 |

OTHER PUBLICATIONS

PCT International Search Report; International Application No. PCT/SE2007/001010; International Filing Date Nov. 14, 2007; Date Mailed Mar. 26, 2008.

* cited by examiner

*Primary Examiner* — Deborah Yee
(74) *Attorney, Agent, or Firm* — Michael-Kinney Group LLP

(57) ABSTRACT

The present invention relates an iron based brazing material comprising an alloy consisting essentially of: 15 to 30 wt % chromium (Cr); 0 to 5.0 wt % manganese (Mn); 15 to 30 wt % nickel (Ni); 1.0 to 12 wt % molybdenum (Mo); 0 to 4.0 wt % copper (Cu); 0 to 1.0 wt % nitrogen (N); 0 to 20 wt % silicone (Si); 0 to 2.0 wt % boron (B); 0 to 16 wt % phosphorus (P); optionally 0.0 to 2.5 wt % of each of one or more of elements selected from the group consisting of carbon (C), vanadium (V), titanium (Ti), tungsten (W), aluminum (Al), niobium (Nb), hafnium (Hf), and tantalum (Ta); the alloy being balanced with Fe, and small inevitable amounts of contaminating elements; and wherein Si, B and P are in amounts effective to lower melting temperature, and Si, B, and P are contained in amounts according to the following formula: Index=wt % P+1.1×wt % Si+3×wt % B, and the value of the Index is within the range of from about 5 wt % to about 20. The present invention relates also to a method of brazing article of stainless steel, and an article of stainless steel.

6 Claims, 2 Drawing Sheets

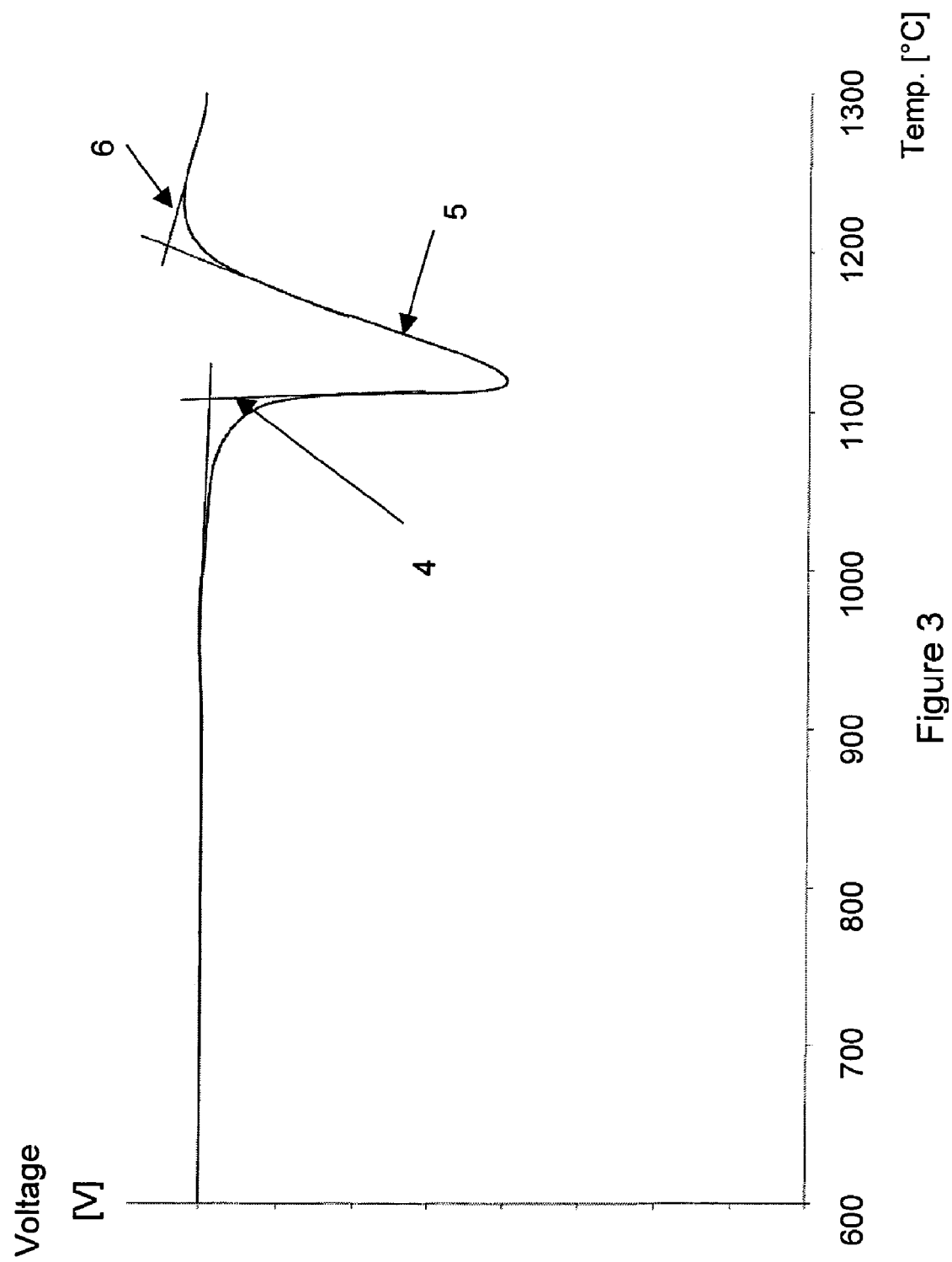

BRAZING MATERIAL

FIELD OF THE INVENTION

The present invention relates to a high alloyed iron-based braze filler material, a method of brazing, and a product brazed with the high alloyed iron-based braze filler material.

BACKGROUND OF THE INVENTION

Objects of different steel materials or iron-based alloy materials are usually assembled by brazing or soldering with Nickel-based or Copper-based brazing materials. Hereinafter the term brazing is used, but it should be understood that the term also comprises soldering. Brazing is a process for joining parts of metals, but brazing can also be used for sealing objects or coating objects. The brazing temperature is below the original solidus temperature of the base material. During brazing, the brazing material is completely or partly melted.

Traditional brazing of iron-based materials is performed using Nickel-based or Copper-based brazing materials, and these brazing materials can cause corrosion due to, for example, differences in electrode potential. The corrosion problem will be enhanced when the brazed object is exposed to a chemically aggressive environment. The use of Nickel-based or Copper-based brazing material can also be limited in a number of food applications due to regulations.

One problem is the melting point of the coating or brazing materials, which are highly alloyed. When selecting a brazing material or a coating material, considerations are based on the solidus or liquidus temperatures of the alloy and the base material. Lately, iron-based brazing materials have been developed for brazing objects of traditional stainless steel. One problem which can occur happens when the base material of an object is a high-alloyed iron-based material, since these lately developed iron-based brazing materials will have a different electrode potential compared to the high-alloyed iron-based material. Differences in electrode potential between the brazed areas and the base material of the object can cause corrosion problems when the high-alloyed steel objects are used in certain environments and applications. The high-alloyed steels have been developed to obtain improved properties for applications in environments which are corrosive, chemically aggressive etc. Therefore, there is a need that the brazing material, when brazing highly alloyed steels, has similar properties such as corrosion resistance as the high alloyed base material, otherwise the brazing material may limit the properties of the brazed product.

High-alloyed iron-based materials are today mainly welded, since the difference in properties between the present brazing materials like for instance Cu—, Ni, and Fe based brazing materials are too wide. The welding technique is costly and time consuming and thus not desirable because the welding normally results in significant stresses in the produced product.

SUMMARY OF THE INVENTION

The present invention provides a new iron-based brazing material, which has a more equal electrode potential between the brazed areas and the high-alloyed iron-based base material of the object. The present invention also has a property to braze an area below the temperature where the brazing material is fully melted and be able to fill and wet the area and crevices etc. when brazing. The present invention thus relates to an iron-based brazing material comprising an alloy containing three or more elements of the group consisting of iron (Fe), chromium (Cr), nickel (Ni), copper (Cu) and molybdenum (Mo). The alloy contains also one or more melting point depressing elements selected from the group consisting of silicon (Si), boron (B), and phosphorus (P). According to one alternative, the alloy may contain an amount of chromium (Cr), an amount of nickel (Ni), and an amount of molybdenum 5 (Mo), the amounts being defined by the formula (wt % Cr+wt % Ni+wt % Mo)$\geq$33 wt %. According to another alternative, the amount of chromium (Cr), the amount of nickel (Ni), and the amount of molybdenum (Mo), may be defined by the formula (wt % Cr+wt % Ni+wt % Mo)$\geq$38 wt %. According to another alternative, the alloy may contain one or more melting point depressing elements in amounts defined by the formula Index=wt % P+1.1×wt % Si+3×wt % B, wherein the value of the Index is within the range of from about 5 wt % to about 20 wt %.

According to a further alternative of the invention, the iron-based brazing material may comprise an alloy containing elements of the group consisting of iron (Fe), chromium (Cr), nickel (Ni), copper (Cu) and molybdenum (Mo), and melting point depressing elements, which comprise one or more of the elements of the group consisting of silicon (Si), boron (B), and phosphorus (P), wherein Si, B and P are present in amounts according to the following formula: Index=wt % P+1.1×wt % Si+3×wt % B wherein the value of the Index is within the range of from about 5 wt % to about 20 wt %, and that chromium (Cr), nickel (Ni), and molybdenum (Mo), being within the ranges defined by the formula wt % Cr+wt % Ni+wt % Mo$\geq$33 wt %, or by the formula wt % Cr+wt % Ni+wt % 5 Mo$\geq$38 wt %, with the proviso that Fe, Cr, Ni, Mo and Cu are present in the alloy and that wt % of Fe>wt % of Cr and that wt % of Ni$\geq$wt % of Mo.

The present invention relates also to an iron-based brazing material comprising an alloy containing essentially 15 to 30 percent by weight, hereinafter wt %, chromium (Cr), 0 to 5.0 wt % manganese (Mn), 15 to 30 wt % nickel (Ni), 0 to 12 wt % molybdenum (Mo), 0 to 4.0 wt % copper (Cu), 0 to 1.0 wt % nitrogen (N), 0 to 20 wt % silicon (Si), 0 to 2.0 wt % boron (B), 0 to 16 wt % phosphorus (P), and optionally 0.0 to 2.5 wt % of each of one or more of elements selected from the group consisting of carbon (C), vanadium (V), titanium (Ti), tungsten (W), aluminum (Al), niobium (Nb), hafnium (Hf), and tantalum (Ta); the alloy being balanced with Fe, and small inevitable amounts of contaminating elements; and wherein Si, B and P are in amounts effective to lower melting temperature, and Si, B, and P are contained in amounts according to the following formula: Index=wt % P+1.1×wt % Si+3× wt % B, and the value of the Index is within the range of from about 5.5 wt % to about 18 wt %. According to one alternative of the invention, the alloy may consist of the above-mentioned elements wherein chromium is within the range from about 18 to about 26 wt % or nickel is within the range of from about 16 to about 26 wt % or molybdenum is within the range from about 1.0 to about 12.0 wt %, or combinations thereof. According to another alternative of the invention, the alloy may consist of the above-mentioned elements wherein chromium is within the range from about 19 to about 25 wt % or nickel is within the range of from about 17 to about 26 wt % or molybdenum is within the range from about 3.5 to about 8.0 wt %, or combinations thereof. According to another alternative of the invention, the alloy may consist of the above-mentioned elements wherein copper (Cu) is within the range 0.1 to 4.0 wt %. According to another alternative of the invention, the alloy may consist of the above-mentioned elements wherein molybdenum is within the range from about 2.0 to about 12.0 wt %. According to another alternative of the invention, the alloy may consist of the above-mentioned elements wherein molybdenum is within the range from about 3.0 to about 9.0 wt %.

According to one alternative aspect of the invention, any one of the elements may be selected from the group consisting of carbon (C), vanadium (V), titanium (Ti), tungsten (W), aluminum (Al), niobium (Nb), hafnium (Hf), and tantalum (Ta) in an amount within the range from about 0 to 1.5 wt %.

According to yet another alternative aspect of the present invention, the contaminating elements in the alloy may be any one of carbon (C), oxygen (O), and sulphur (S). According to another alternative, Ni may be present in the alloy and the amount is within the range of 0.1 to 1.0. According to another alternative, manganese may be present in the alloy and the amount is within the range of 0.1 to 4.5. According to yet another alternative aspect of the present invention, the alloy may contain silicon within the range from about 8.0 to about 12 wt % or boron within the range from about 0.1 to about 1.0 wt % or phosphorus within the range from about 5.0 to about 14 wt %, or combinations thereof.

According to yet another alternative aspect of the present invention, the alloy may contain silicon within the range from about 8.0 to about 12 wt % or boron within the range from about 0.1 to about 1.0 wt % or phosphorus within the range from about 5.0 to about 14 wt %, or combinations thereof.

According to yet another alternative aspect of the present invention, the alloy may contain silicon within the range from about 8.0 to about 12 wt % and boron within the range from about 0.25 to about 0.80 wt % B.

According to yet another alternative aspect of the present invention, the alloy may contain phosphorus within the range from about 7.0 to about 13 wt %.

According to yet another alternative aspect of the present invention, the alloy may contain silicon within the range from about 2.0 to about 8.0 wt % and phosphorus within the range from about 2.0 to about 8.0 wt %.

According to a further alternative aspect of the present invention, the alloy may contain silicon less than 10 wt % or boron less than 1.5 wt % or phosphorus less than 12 wt %, or combinations thereof.

According to yet a further alternative aspect of the present invention, the alloy may contain silicon within the range of from about 8.0 to about 12 wt % and boron is within the range of from about 0.1 to about 1.5 wt %.

According to still a further alternative aspect of the present invention, the alloy may contain silicon within the range of from about 2.5 to about 9.0 wt % and phosphorous is within the range of from about 2.5 to about 9.0 wt %.

The brazing cycle involves both melting and solidifying of the brazing material. The melting temperature and solidifying temperature may be the same for very specific materials, but the usual situation is that materials melt within the temperature range of melting, and solidify within another temperature range of solidifying. The temperature range between the solidus state and the liquidus state is herein defined as the temperature difference between the solidus state and the liquidus state, and is measured in a number of ° C. The brazing material thus has a temperature range between the solidus state and the liquidus state, which according to one alternative aspect of the invention may be within a temperature range of 200° C. According to another alternative, the alloy may have a solidus temperature and a liquidus temperature within a temperature range of 150° C. According to another alternative, the alloy may have a solidus temperature and a liquidus temperature within a temperature range of 100° C. According to another alternative aspect of the invention, the alloy may have a solidus temperature and a liquidus temperature within a range of 75° C. According to another alternative aspect of the invention, the alloy may have a solidus temperature and a liquidus temperature within a range of 50° C.

The alloy of the invention may be obtained by gas or water atomising processes, by a melt-spinning process, by the crushing of ingots containing the iron-based alloy material, or by mixing the alloy such as high alloyed steels with alloys containing Si, P, B, or combinations thereof, in a higher amount than the high alloyed steels used when blending or by mixing alloy such as alloys with high chromium content, nickel content, molybdenum content, or combinations thereof, with alloys containing Si, P, B, or combinations thereof, in a higher amount than the alloys used when blending.

According to a further alternative aspect of the present invention, the iron-based brazing material may be manufactured as a paste. The iron-based brazing paste of the invention may comprise the iron-based brazing material and an aqueous binder system or an organic binder system. The binder system may comprise a solvent, which could be hydrophilic or hydrophobic, i.e. water-based or oil-based. The oil-based binder could be a polymer such as poly (met) acrylate among others; the oil-based binder could also be biopolymers such as cellulose derivatives, starches, waxes, etc. According to another alternative, the iron-based brazing paste of the invention may comprise the iron-based brazing material and an aqueous binder system or an organic binder system based on a solvent such as water, oils, or combinations thereof. The alloy comprised in the paste may be in the form of powder, granules etc.

The present invention relates also to a method of brazing articles of stainless steel, comprising the following steps: step (i) applying the brazing material of the invention on to parts of stainless steel; step (ii) optionally assembling the parts; step (iii) heating the parts from step (i) or step (ii) in a non-oxidizing atmosphere, in a reducing atmosphere, in vacuum or combinations thereof up to a temperature of at least 900° C., and then brazing the parts at the temperature of at least 1070° C. for at least 15 minutes; and optionally step (iv) repeating one or more of step (i), step (ii) and step (iii). Different brazed products need different brazing procedures; some products could be brazed by just going through step (i), step (ii) and step (iii), but other products are more complicated and one or more of step (i), step (ii) and step (iii) need to be repeated as indicated in step (iv).

According to an alternative of the invention, the parts are brazed at the temperature of at least 1100° C.

According to an alternative of the invention, the method may also comprise that the parts in step (iii) are heated in a non-oxidizing atmosphere, in a reducing atmosphere, in vacuum, or in combinations thereof, up to a temperature of at least 250° C. for at least 10 minutes, then heating the parts up to a temperature of less then 1080° C. for at least 30 minutes, then heating the parts up to a temperature over about 1100° C. for less than 720 minutes, and then cooling the parts.

According to one alternative of the present invention, the parts may be heated up to a temperature over about 1100° C. for less than 360 minutes before cooling the parts. According to another alternative of the present invention, the parts may be heated up to a temperature over about 1100° C. for less than 180 minutes before cooling the parts.

According to an alternative of the invention, the method may also comprise that the parts in step (iii) are preheated to a temperature below 1120° C. before heating to a temperature of about 1200° C. for at least 30 minutes.

According to another alternative of the invention, the method may also comprise that the parts in step (iii) are preheated up to a temperature below 1120° C. before heating up to a temperature within the range from 1150° C. to 1250° C. for at least 30 minutes.

According to another alternative of the invention, the method may also comprise that the parts in step (iii) are preheated to a temperature below 1040° C. before brazing at a temperature within the range from 1050° C. to 1150° C. for at least 15 minutes.

According to an alternative of the invention, the method may also comprise that the parts in step (iii) are preheated up to a temperature below 1120° C. before heating up to a temperature of approximately 1200° C. for at least 120 minutes. And then heat treating the parts at a temperature above 950° C. for at least an accumulated time of 20 minutes, this can be made in the braze cycle, but also after the braze in e.g. at a second heating source.

According to another alternative, the brazing material may be sprayed as a powder on the surfaces, which shall be joined by for instance a paint spray gun, rolling, brushing, thermal spraying, e.g. high velocity oxygen fuel (HVOF) etc or the surface, joint etc. may be coated by melts.

The iron based brazing filler material may be applied to planar surfaces or to large surfaces by the aid of capillary force breakers. The capillary force breakers can be in form of grooves, traces, paths, passages, "v" or "u" shaped tracks or pathways etc. or in form of nets etc. The iron-based brazing filler material may be applied into the capillary force breakers, i.e. into the grooves, traces, paths, passages, "v" or "u" shaped tracks, pathways, nets, etc., or the brazing filler material may be applied close to the capillary force breakers. During heating, the applied iron-based brazing filler material will flow to the area where the capillary force may be broken and braze together the surfaces, which are adjacent to each other. Thus, the brazed area provides brazed, sealed or tight crevices, joints etc. between planar surfaces where it is hard otherwise to braze uniformly. The capillary force breakers also enable brazing surfaces having large crevices, parts having odd shape, etc.

When the brazing material is applied between two parts close to a capillary force breaker, the flowing viscous brazing material will stop the flowing motion and set at the rim of the capillary force breaker. A reactor channel may function as a capillary force breaker. A plate having a reactor channel is applied with brazing material and a barrier plate or the like is placed in contact with the reactor channel plate. The flowing brazing material will stop and set at a border of the reactor channel, which will seal the reactor plate against the barrier plate without filling the reactor channel with set brazing material.

How far the brazing material can flow between two bordering surfaces depends partly on the setting time of the brazing materials and the distance between the surfaces, and the amount of brazing material. Since the brazing material "sticks" to each surface, which is to be brazed, the intermediate space between the surfaces becomes smaller. As the intermediate space becomes smaller while at the same time the brazing material sets, it also becomes more difficult for the brazing material to flow in between. The desired amount of brazing material is supplied to the contact points, which are to be brazed together in any of the described or other ways. The brazing material may cover an area that is somewhat larger than the contact joint point. The contact joint points may have a diameter of at least 0.5 mm. Since the brazing process is a metallic process and the respective surfaces for brazing take the form of metallic material, then iron-based brazing material during the brazing process diffuses with bordering surfaces, which are to be brazed together. The joint or seam between the two joined surfaces will more or less "disappear" during the brazing process according to one aspect of the invention. The brazed seam together with the surfaces of the metallic parts will become a unity with only small changes in material composition of the alloys.

During brazing, the brazing material will migrate by capillary forces to areas to be joined by brazing. The brazing material according to the present invention has good wetting ability and good flow ability, which will result that residual alloys around the brazing areas will be small. According to one alternative, the residual alloys after brazing will have a thickness less than 0.1 mm on the applied surfaces.

The present invention relates also to an article of stainless steel obtained by the present method. The present invention relates further to a brazed article of stainless steel, which comprises at least one base material of stainless steel and brazed brazing material of the invention.

According to one alternative aspect, the articles or the parts may be selected from reactors, separators, columns, heat exchangers, or equipments for chemical plants or food plants, or for car industry. According to another alternative aspect, the objects may be heat exchangers, plate reactors, or combinations thereof. According to another alternative aspect of the invention, the brazed article may be a paring disc, which is used in a separator. According to one alternative aspect, the articles may be brazed heat exchanger plates, brazed reactor plates, or combinations thereof.

When the parts are heat exchanger plates, the plates can be endplates, adaptor plates, sealing plates, frame plates etc., and constitute a heat exchanger system. Each of the heat exchanger plates comprise at least one port recess, which port recesses together form part of a port channel when the plates are placed on one another. The plates are stacked together in a plate stack or a plate pack in the heat exchanger. The plate package comprises between the plates a number of channels, which accommodate a number of media. The media in adjacent channels are subject to temperature transfer through the heat transfer plate in a conventional manner. The plates may comprise an edge, which may partly extend down and over the edge portion of an adjacent heat transfer plate in the plate stack. The edges of the plates seal against the adjacent heat transfer plate in such a way that a channel may be formed between the plates. This channel either allows flow of a medium or is closed so that no flow takes place and the channel is therefore empty. To stiffen the plate package and the port regions, an adaptor plate or an endplate may be fitted to the package. The surfaces of the endplate or the adaptor plate are with may be planar so that contact surfaces between the surfaces may be maximised. As previously mentioned, the respective port recesses on the plates coincide, thereby forming a channel. On the inside of this port channel, there is therefore a joint between the two plates. To prevent leakage at this joint, brazing material may be applied round the port region between the plates. The brazing material may be placed in or close by a capillary force breaker, which may extend wholly or partly round the port region between the plates. In the plate package, brazing material may be applied on different pre-designed or predetermined parts of the plates. During the brazing process, the brazing material will become viscous and will flow from the applied parts out between the plates due to the action of capillary force. The advantage of applying brazing material on to predetermined places makes it possible to control volume and amount of the brazing material, and to control which parts of the surfaces to be brazed and which are not. When brazing a heat exchanger, at least three heat exchanger plates are needed, but it is usual that several plates are brazed together. According to one alternative aspect of the invention are a plate pack of several plates brazed together at the same time in the same furnace.

The brazing method of the invention may either comprise brazing the article assembled with all its parts at the same time or the article may be brazed in a stepwise fashion where parts are first assembled and brazed together, and then assembled with further parts and brazed together, and so on using the same type of brazing material in each brazing cycle.

Further developments are specified in independent claims and the dependent claims.

BRIEF DESCRIPTION OF THE DRAWINGS

The invention is explained in more detail in by means of the following Examples and FIGS. 1, 2 and 3.

FIG. 3 is graph showing an estimation of melting interval performed by approximation of the melting curve.

The purpose of the Examples and FIGS. 1, 2 and 3 are to test the brazing material of the invention, and are not intended to limit the scope of invention.

EXAMPLE 1

Test samples 1 to 12 were made for checking the solidus and liquidus temperatures of the brazing material of the invention. The compositions of the test samples are summarised in Table 1.

TABLE 1

| No. | Fe | Cr | Mn | Ni | Mo | Si | B | P | Cu | N |
|---|---|---|---|---|---|---|---|---|---|---|
| 1 | 42.61 | 20.1 | 1.03 | 18.2 | 6.2 | 10.58 | 0.49 | | 0.79 | 0.19 |
| 2 | 42.04 | 20.2 | 1.01 | 18.3 | 6.15 | 10.95 | 0.57 | | 0.78 | 0.23 |
| 3 | 41.27 | 20.4 | 1.05 | 18.3 | 6.11 | 11.53 | 0.58 | | 0.76 | 0.16 |
| 4 | 41.45 | 20.5 | 1.05 | 18.1 | 6.31 | 11.22 | 0.58 | | 0.79 | 0.065 |
| 5 | 40.84 | 20.3 | 0.9 | 18.4 | 6.22 | 11.91 | 0.66 | | 0.77 | 0.08 |
| 6 | 41.63 | 20.5 | 1.45 | 18.4 | 6.18 | | | 11.1 | 0.74 | 0.13 |
| 7 | 40.33 | 20.4 | 1.18 | 18.1 | 6.2 | | | 13.0 | 0.79 | 0.23 |
| 8 | 41.35 | 20.3 | 1.1 | 18.3 | 6.24 | 5.66 | | 6.3 | 0.75 | 0.095 |
| 9 | 39.49 | 20.3 | 1.11 | 18.1 | 6.3 | 6.48 | | 7.5 | 0.72 | 0.2 |
| 10 | 37.87 | 23.0 | 1.0 | 19.9 | 5.95 | 10.79 | 0.72 | | 0.77 | 0.076 |
| 11 | 43.87 | 20.2 | 1.15 | 18.0 | 6.25 | 9.46 | 0.26 | | 0.73 | 0.08 |
| 12 | 42.547 | 19.8 | 1.16 | 17.8 | 6.29 | 11.31 | 0.28 | | 0.76 | 0.053 |

The liquidus and solidus temperature of the samples was tested by means of differential thermal analysis (DTA). The atmosphere used when analysing was Argon. The test was performed with a heating and cooling rate of 10° C./min. The liquidus temperature is the temperature above which a substance is completely liquid. The solidus temperature is the temperature below which a substance is completely solid. The values for the solidus and liquidus temperature were established by estimations where the melting process started and stopped. The estimations were performed by approximation of the melting curve, which was measured and registered as a DTA-curve, see FIG. 3. The melting process can be seen in the DTA-curve by the change in the gradient of the heating curve. When the process is finalised, the gradient becomes constant again. To establish the start and stop of the melting process, an approximation was made by drawing tangents (5) on the energy drop peak (6). Tangents (7) on the base line is drawn and where the tangents (5) and (7) are crossing each other, there are the approximated end values of the melting range.

TABLE 2

| Sample No. | Solidus Temperature [° C.] | Liquidus Temperature [° C.] |
|---|---|---|
| 1 | 1097 | 1221 |
| 2 | 1094 | 1221 |
| 3 | 1101 | 1216 |
| 4 | 1113 | 1197 |
| 5 | 1114 | 1200 |
| 6 | 1038 | 1074 |
| 7 | 1038 | 1057 |
| 8 | 1047 | 1112 |
| 9 | 1037 | 1119 |
| 10 | 1105 | 1220 |
| 11 | 1110 | 1258 |
| 12 | 1111 | 1242 |

EXAMPLE 2

Figure 1:
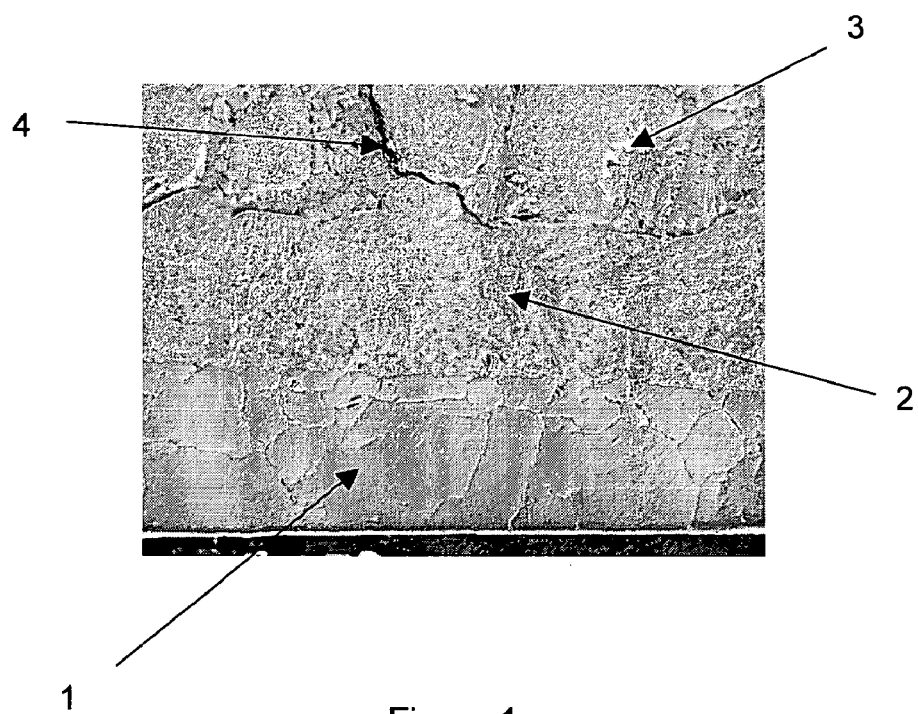
FIG. 1 is a photograph of a brazed area which is tested in a "bend test;"
Figure 2:
FIG. 2 is a photograph of a brazed area which is tested in a "bend test;"

A "bend test" was performed on sample no. 6 and a photo was taken on the result, see FIG. 1. Sample 6 was placed on a plate of base material and heated in a vacuum furnace for at least 10 minutes at approximately 1200° C. The test plate was then cooled to room temperature and a "bend test" was performed. FIG. 1 is showing the base material 1 at the bottom of the photo, a reaction zone 2 above the base material, which reaction zone is a zone where the brazing material and the base material has diffused together. On top of the reaction zone is the brazed material 3. The photo is showing that the bending test created a crack 4 in the brazed material 3, which was expected. The surprising result was that the crack did not pass the reaction zone 2, but instead the crack turned and stopped. To double check the result, a new test was made using sample no. 7 and the same procedure, see photo in FIG. 2. The second test did result with a similar crack, which also was turning away from the reaction zone.

What is claimed is:

1. An iron-based brazing material comprising an alloy consisting essentially of:
(i) 15 to 30 wt % chromium (Cr);
(ii) 0.1 to 4.5 wt % manganese (Mn);
(iii) 15 to 30 wt % nickel (Ni);
(iv) 1.0 to 12 wt % molybdenum (Mo);
(v) 0.1 to 4.0 wt % copper (Cu);
(vi) 0 to 1.0 wt % nitrogen (N);
(vii) 8.0 to 12.0 wt % silicon (Si);
the alloy being balanced with iron (Fe); and
wherein the alloy further contains boron within the range from 0.1 to about 1.0 wt %, or the alloy further contains phosphorous within the range of from 5.0 to about 14 wt %, or the alloy further contains combinations of B within said range and P within said range; and wherein Si, B, and P are in amounts effective to lower melting temperature of a brazing material formed by the alloy, and Si, B, and P are contained in amounts according to the following formula: Index=wt % P+1.1×wt % Si+3×wt % B, and the value of the Index is within the range of from 9.1 wt % to about 20 wt %; and wherein the alloy optionally contains one or more of elements selected from the group consisting of carbon (C), vanadium (V), titanium (Ti), tungsten (W), aluminum (Al), niobium (Nb), hafnium (Hf), and tantalum (Ta), wherein the amount of each element is within the range from 0.0 to 2.5 wt %, the alloy being balanced with Fe and small inevitable amounts of contaminating elements.

2. An iron based brazing material according to claim 1, wherein the contaminating elements are any one of carbon (C), oxygen (O), and sulphur (S).

3. An iron based brazing material according to claim 1, wherein chromium is within the range from 18 to 26 wt %.

4. An iron based brazing material according to claim 1, wherein nickel is within the range of from 16 to 26 wt %.

5. An iron based brazing material according to claim 1, wherein molybdenum is within the range from 2.0 to 12.0 wt %.

6. An iron based brazing material according to claim 1, wherein the alloy is produced by gas-atomizing or water-atomizing or melt-spinning.

* * * * *